(12) United States Patent
Baba

(10) Patent No.: US 12,712,949 B2
(45) Date of Patent: Aug. 18, 2026

(54) INFORMATION PROCESSING APPARATUS THAT DETECTS HIGH LOAD PERIODS OF A PROXY SERVER BASED ON A SOFTWARE DISTRIBUTION SCHEDULE, CONTROL METHOD OF INFORMATION PROCESSING APPARATUS, AND RECORDING MEDIUM

(71) Applicant: CANON KABUSHIKI KAISHA, Tokyo (JP)

(72) Inventor: Shohei Baba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/797,411

(22) Filed: Aug. 7, 2024

(65) Prior Publication Data

US 2025/0055928 A1 Feb. 13, 2025

(30) Foreign Application Priority Data

Aug. 10, 2023 (JP) ................................ 2023-131083

(51) Int. Cl.
*G06F 15/16* (2006.01)
*H04L 67/00* (2022.01)
*H04L 67/56* (2022.01)

(52) U.S. Cl.
CPC .............. *H04L 67/56* (2022.05); *H04L 67/34* (2013.01)

(58) Field of Classification Search
CPC ................................ H04L 67/56; H04L 67/34
USPC .......................................................... 709/217
See application file for complete search history.

(56) References Cited

U.S. PATENT DOCUMENTS 7,260,602 B2 * 8/2007 Osborne ................. H04L 67/34 709/227
7,562,410 B2 * 7/2009 Morris .................... H04L 12/66 709/224
7,987,471 B2 * 7/2011 Herzog ................. H04L 67/125 718/100
8,260,840 B1 * 9/2012 Sirota ................... G06F 9/5061 725/94
8,296,385 B2 * 10/2012 Locker ...................... G06F 8/61 709/205
8,296,419 B1 * 10/2012 Khanna ................. G06F 9/5072 718/1
8,321,558 B1 * 11/2012 Sirota ................... G06F 9/5011 718/1

(Continued)

FOREIGN PATENT DOCUMENTS

JP 2017-033147 2/2017

*Primary Examiner* — Alicia Baturay
(74) *Attorney, Agent, or Firm* — Venable LLP

(57) ABSTRACT

An information processing apparatus comprising a proxy server configured to relay communication between a network device and a software distribution system configured to provide software distribution services to the network device, is configured to acquire a distribution schedule of the network device, which is the target of the software distribution service and is configured to perform communication via the proxy server, from the software distribution system; detect time periods during which a predetermined load or higher is applied to the proxy server based on the distribution schedule by communication performed with a plurality of the network devices via the proxy server; and perform a notification to the software distribution system based on the result of the detection.

9 Claims, 13 Drawing Sheets

(56) References Cited

U.S. PATENT DOCUMENTS 8,407,776 B2 * 3/2013 Somani .................. H04L 67/55
726/9
8,418,181 B1 * 4/2013 Sirota .................... H04L 67/00
709/224
8,606,935 B2 * 12/2013 Nakagawa .......... H04L 63/0884
709/224
8,719,415 B1 * 5/2014 Sirota .................. G06F 9/5061
709/221
8,863,143 B2 * 10/2014 Jackson ................ G06F 9/5083
709/221
8,966,030 B1 * 2/2015 Sirota .................... H04L 67/10
709/221
9,072,972 B2 * 7/2015 Ahiska ................ H04L 67/5682
9,100,297 B2 * 8/2015 DeHaan .................. H04L 43/14
9,276,987 B1 * 3/2016 Sirota .................. G06F 9/5033
9,280,390 B2 * 3/2016 Sirota .................. G06F 9/4881
9,329,909 B1 * 5/2016 Khanna ............... H04L 67/1029
9,358,460 B2 * 6/2016 Ahiska .................... A63F 13/60
9,517,410 B2 * 12/2016 Ahiska .................... A63F 13/77
9,675,890 B2 * 6/2017 Ahiska .................. A63F 13/358
10,015,239 B1 * 7/2018 Flowers .................. H04L 69/26
10,038,755 B2 * 7/2018 Somani ................. H04L 67/025
10,055,170 B2 * 8/2018 Resch ................. G06F 11/1092
10,171,885 B2 * 1/2019 Pfeffer .................. H04N 21/24
10,331,524 B2 * 6/2019 Formato ............ G06F 11/1461
10,389,831 B2 * 8/2019 Somani .................. H04L 67/14
10,649,900 B2 * 5/2020 Nakra ................. G06F 12/0864
10,701,027 B2 * 6/2020 Flowers .................. H04L 69/26
10,705,776 B2 * 7/2020 Mihira .................. G06F 3/1236
10,762,218 B2 * 9/2020 Anandam ............. G06F 9/5072
10,873,623 B2 * 12/2020 Khanna ................. G06F 9/5072
10,956,277 B2 * 3/2021 Formato ............ G06F 11/1464
11,110,347 B2 * 9/2021 Liu ....................... A63F 13/352
11,115,447 B2 * 9/2021 Viljamaa ............... H04L 65/612
11,178,222 B1 * 11/2021 Wakelin .................. H04L 69/40
11,425,194 B1 * 8/2022 Khanna ................. G06F 9/5083
11,592,803 B2 * 2/2023 Koga ...................... G06F 17/40
11,650,857 B2 * 5/2023 Jackson ................ G06F 9/5077
718/105
12,088,577 B2 * 9/2024 Nelson-Gal ............. H04L 43/50
12,131,185 B2 * 10/2024 Julien ................... G06F 9/5072
12,206,550 B2 * 1/2025 Nelson-Gal ............. H04L 43/50
12,219,100 B2 * 2/2025 Baba ................. H04N 1/00323
12,225,097 B2 * 2/2025 Baba ....................... H04L 67/56
12,341,929 B2 * 6/2025 Dai .................... H04M 3/5191
12,418,597 B2 * 9/2025 Kamoi .................... H04L 67/56
2005/0125275 A1 * 6/2005 Wright ........... G06Q 10/063114
705/7.15
2007/0244999 A1 * 10/2007 Hamanaka .............. H04L 67/34
709/220
2008/0133650 A1 * 6/2008 Saarimaki ........... H04L 67/1068
709/203
2008/0201454 A1 * 8/2008 Soffer ..................... H04L 41/00
709/220
2008/0294718 A1 * 11/2008 Okano .................... H04L 67/56
709/203
2012/0130725 A1 * 5/2012 Cooper .................. G06Q 10/10
705/1.1
2017/0031675 A1 2/2017 Oshima
2018/0198855 A1 * 7/2018 Wang .................... G06F 9/5083
2020/0076982 A1 3/2020 Baba ........................ H04N 1/32
2022/0200962 A1 * 6/2022 Nilekar ............... H04L 63/0263
2024/0264880 A1 * 8/2024 Molleti ................... G06F 9/541
2024/0406109 A1 * 12/2024 Akhmetzhanov ..... H04L 47/122
2025/0117168 A1 * 4/2025 Baba ..................... H04L 67/561

* cited by examiner 105,106
300
CONTROL UNIT
301
CPU
302
ROM
303
RAM
304
HDD
305
OPERATION UNIT I/F
306
PRINTER I/F
307
SCANNER I/F
308
NETWORK I/F
310
OPERATION UNIT
320
PRINTER
330
SCANNER 104
401
MONITORING MODE MANAGEMENT UNIT
402
PROXY SERVER
403
CONTRACT INFORMATION MANAGEMENT UNIT
404
SETTING INFORMATION DB
405
DEVICE MANAGEMENT UNIT
406
DEVICE INFORMATION DB
407
DISTRIBUTION SCHEDULE MANAGEMENT UNIT
408
DISTRIBUTION INFORMATION DB
409
EVENT MANAGEMENT UNIT
410
EVENT INFORMATION DB
411
LOAD DETECTION UNIT
412
NOTIFICATION UNIT
413
DISPLAY CONTROL UNIT

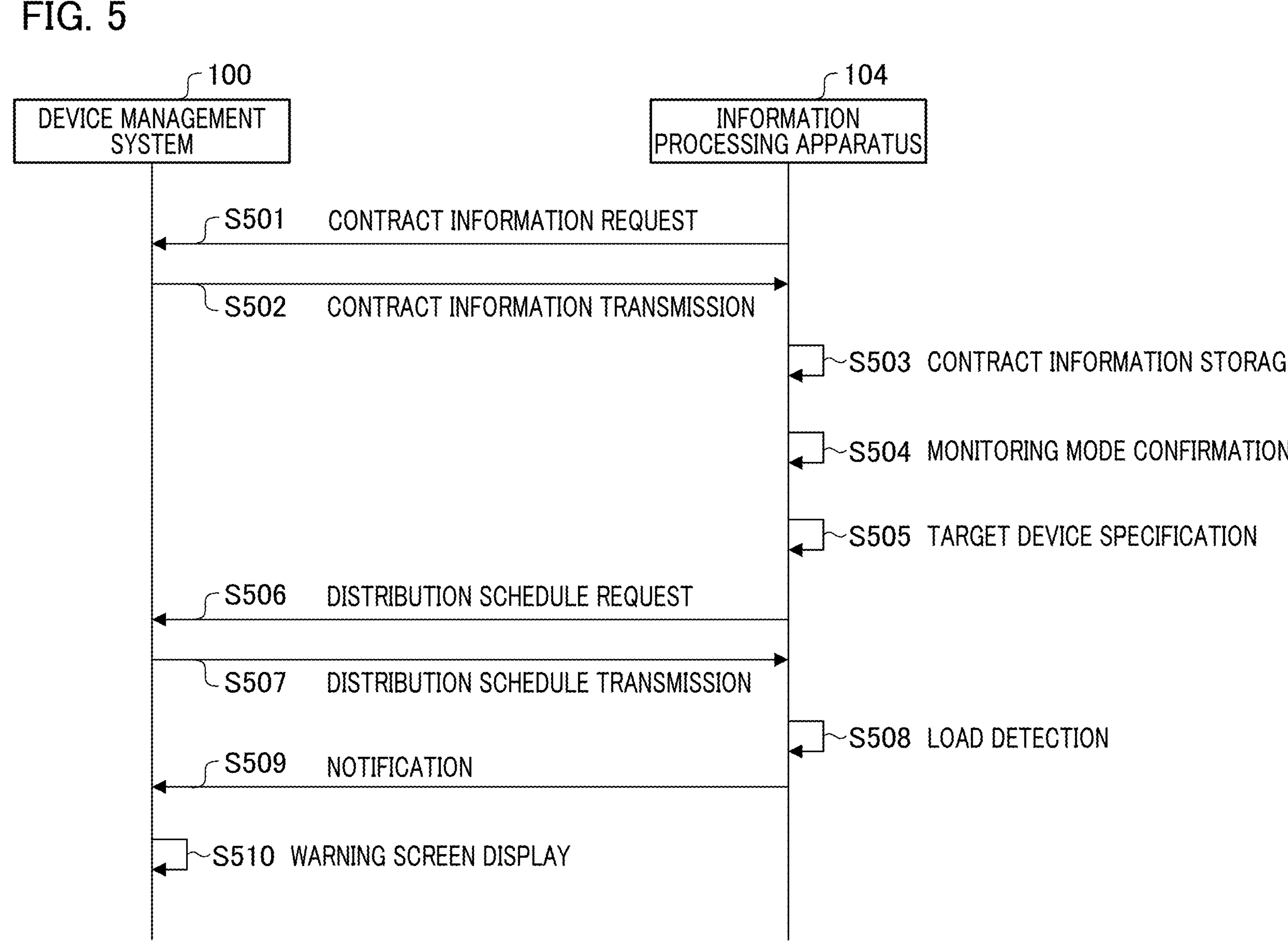
FIG. 5
100
DEVICE MANAGEMENT SYSTEM
104
INFORMATION PROCESSING APPARATUS
S501 CONTRACT INFORMATION REQUEST
S502 CONTRACT INFORMATION TRANSMISSION
S503 CONTRACT INFORMATION STORAGE
S504 MONITORING MODE CONFIRMATION
S505 TARGET DEVICE SPECIFICATION
S506 DISTRIBUTION SCHEDULE REQUEST
S507 DISTRIBUTION SCHEDULE TRANSMISSION
S508 LOAD DETECTION
S509 NOTIFICATION
S510 WARNING SCREEN DISPLAY

Figure 7:
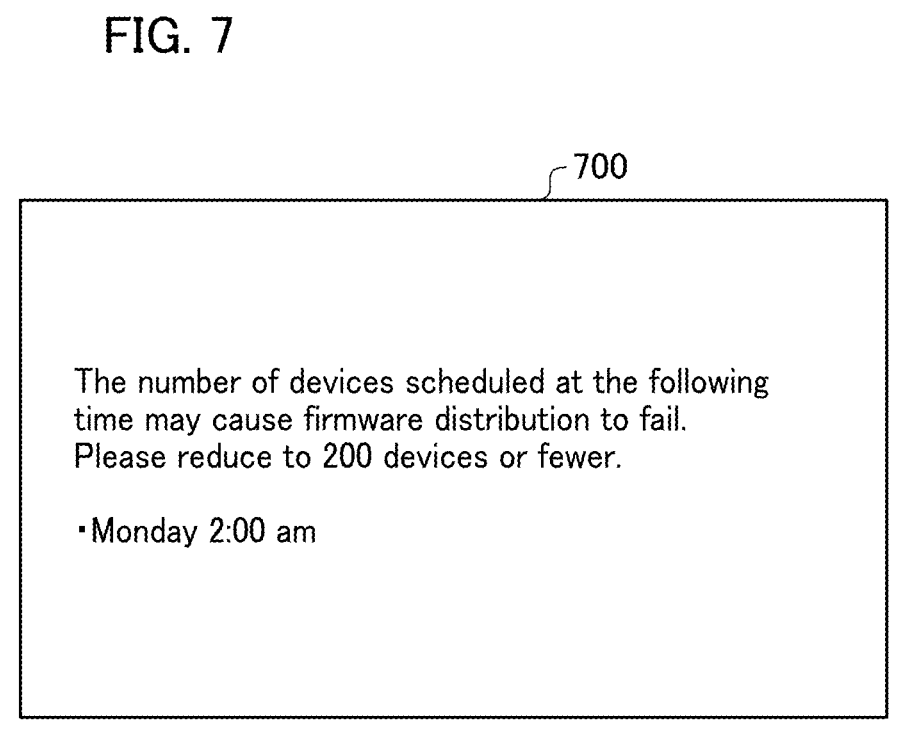

The number of devices scheduled at the following time may cause firmware distribution to fail.
Please reduce to 200 devices or fewer.

・Monday 2:00 am

FIG. 13

INFORMATION PROCESSING APPARATUS THAT DETECTS HIGH LOAD PERIODS OF A PROXY SERVER BASED ON A SOFTWARE DISTRIBUTION SCHEDULE, CONTROL METHOD OF INFORMATION PROCESSING APPARATUS, AND RECORDING MEDIUM

BACKGROUND OF THE INVENTION

Field of the Invention

The present invention relates to an information processing apparatus that functions as a proxy server, a control method of the information processing apparatus, and a recording medium.

Description of the Related Art

A device management system for acquiring and managing data such as operation information of a network device such as a printer and multifunction device is known. For performing continuous management of the device, the device management system manages the status, the device settings, the firmware, and the like, and it is possible to acquire and distribute these periodically. Japanese Patent Laid-Open No. 2017-33147 discloses a technology in which an internet-based distribution system displays a GUI for an operator to perform settings for the delivery date and time of firmware and applications, and performs distribution of updates to the device according to the settings specified in the GUI. In addition, the distribution system and the device management system acquire data from a device and as a mechanism for managing the device, there is a mechanism of periodic polling and of the data passing through a proxy server.

However, the distribution system of Japanese Patent Laid-Open No. 2017-33147 does not retain information as to whether a distribution target device is managed via the proxy server. Therefore, although there are limitations on the number of devices that can communicate simultaneously via the proxy server, on the side of the distribution system, setting a distribution schedule that considers the load of the proxy server in software distribution is difficult. In a case in which software distribution is performed exceeding the number of devices that can communicate simultaneously at the proxy server, there is a risk that some of the software distribution may end in failure.

SUMMARY OF THE INVENTION

The present invention performs schedule management to suppress the failure of software distribution via a proxy server.

The information processing apparatus of the present invention is an information processing apparatus having a proxy server configured to relay communication between a network device and a software distribution system that provide software distribution services to the network device, the information processing apparatus comprising a distribution schedule management unit configured to acquire a distribution schedule of the network device, which is the target of the software distribution service and is configured to perform communication via the proxy server, from the software distribution system, a load detection unit configured to detect time periods during which a predetermined load or higher is applied to the proxy server based on the distribution schedule by communication performed with a plurality of the network devices via the proxy server, and a notification unit configured to perform a notification to the software distribution system based on the result of the detection.

Further features of the present invention will become apparent from the following description of embodiments with reference to the attached drawings.

BRIEF DESCRIPTION OF THE DRAWINGS

FIG. 5 is a sequence diagram showing distribution schedule confirmation processing.

FIG. 7 is a diagram showing an example of a warning screen.

FIG. 13 is a diagram showing an example of a schedule setting screen.

DESCRIPTION OF THE EMBODIMENTS

First Embodiment

Figure 1:
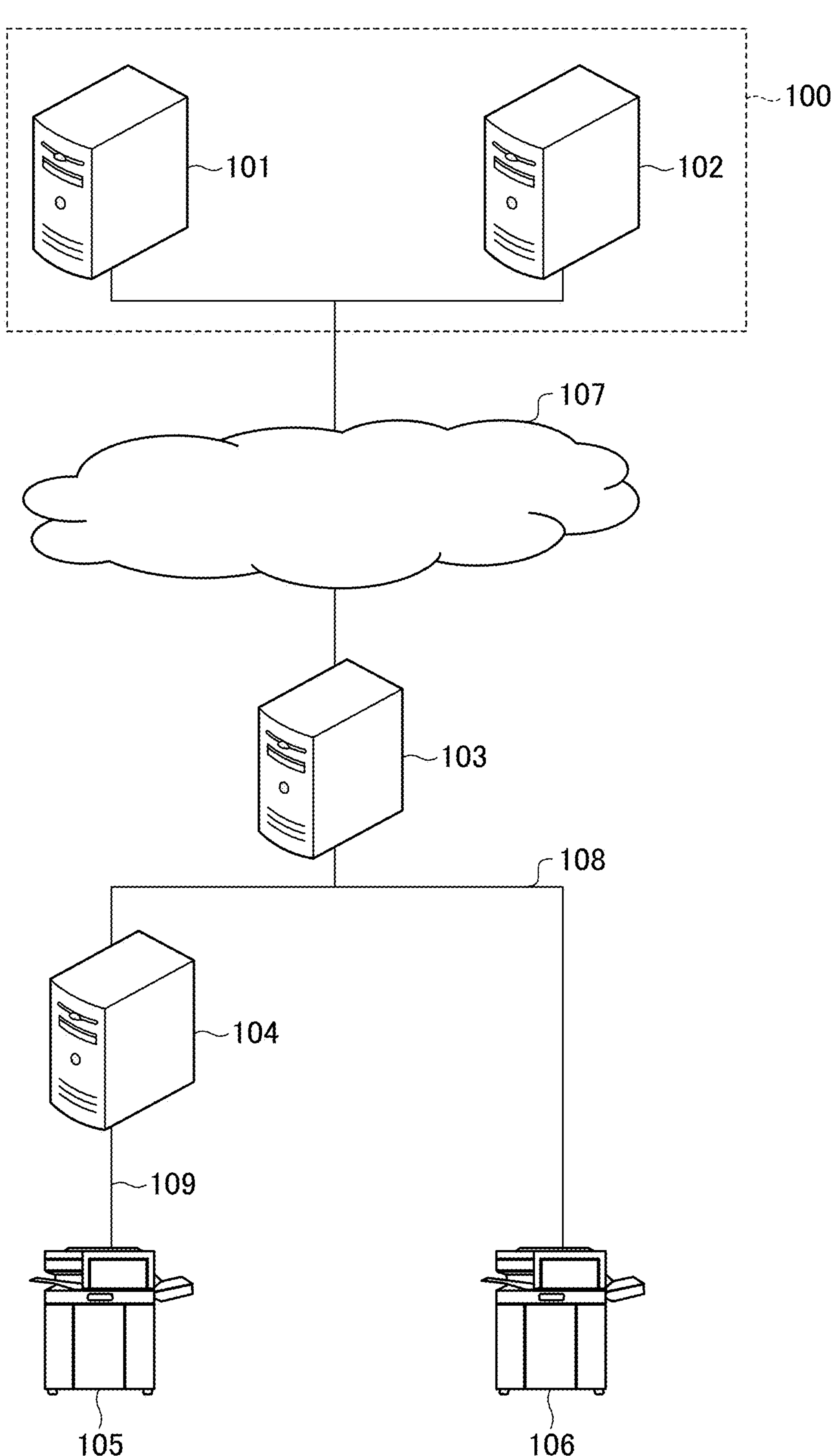
FIG. 1 is a diagram showing the configuration of the entire system.

FIG. 1 is a diagram showing the configuration of the entire system. A device management system 100 is a system for managing network devices via a network. The device management system 100 includes a management server 101 and a firmware distribution server 102. It should be noted that in the present embodiment, although the case in which the management server 101 and the firmware distribution server 102 are separate apparatuses will be explained as an example, the management server 101 and the firmware distribution server 102 may be implemented on the same server.

The device management system 100 manages a device 105 and a device 106, which are network devices, via the network. An information processing apparatus 103 configured to function as a proxy server is connected between the device management system 100 and the device 106. In addition to the information processing apparatus 103, which is configured to function as a proxy server, an information processing apparatus 104, which is also configured to function as a proxy server, is connected between the device management system 100 and the device 106.

The device management system 100 connects to the information processing apparatus 103 via a network 107. The network 107 is, for example, a WAN (Wide Area Network). The information processing apparatus 103 connects to the device 106 via a network 108. In addition, the information processing apparatus 103 connects to the information processing apparatus 104 via the network 108, and the information processing apparatus 104 connects to the device 105 via a network 109. The network 108 and the network 109 are, for example, intra-company LANs (Local Area Networks). The environment connected via the network 108 and the network 109 is, for example, an intra-company environment.

The information processing apparatus 103 is a proxy server installed at the boundary between the network 107 and the network 108. That is, communication between devices in the intra-company environment and the network 107 is monitored and protected by the information processing apparatus 103. Therefore, in the intra-company environment, threats of, for example, access to a device by an attacker from the network 107 are greatly reduced.

The information processing apparatus 104 is an information processing apparatus configured to include the function of a proxy server that is installed between the network 108 and the network 109. The information processing apparatus 104 aggregates communication between devices on the network 109 and the device management system 100. Although the information processing apparatus 103 is a dedicated proxy server disposed at the boundary between the internal network of the company and the internet, the information processing apparatus 104 implements functions of the proxy server by software on a PC. Therefore, the number of communication requests processable simultaneously by the proxy server of the information processing apparatus 104 is fewer and limited compared to the number of communication requests processable simultaneously by the information processing apparatus 103.

The management server 101 is an information processing apparatus configured to provide a device management service for managing network devices via a network. The management server 101 communicates with the device 105 and the device 106 to acquire data and device status from the network devices and distribute setting values. It should be noted that in addition to one or a plurality of information processing apparatuses, a service provided by the management server 101 may be implemented by a virtual machine (cloud service) that uses resources provided by a data center that includes information processing apparatuses, or by a combination thereof. In addition, the device management service provided by the management server 101 may also be implemented as a web-based application, and on client terminals via a web browser.

The firmware distribution server 102 is an information processing apparatus configured to implement a software distribution system that provides a software distribution service to manage and distribute network device firmware and software such as expansion applications. In the present embodiment, although the case in which the firmware distribution server 102 provides the firmware distribution service will be explained as an example, the target of distribution is not limited to firmware and may include any software or content that can be distributed to devices via a network. Services provided by the firmware distribution server 102 may be implemented by one or a plurality of information processing apparatuses, virtual machines using resources provided by data centers that include information processing apparatuses (cloud services), or a combination thereof.

The device 105 and the device 106 are network devices. The device 105 and the device 106 receive the device management service provided by the device management system 100. In the present embodiment, the case in which the network devices are image processing apparatuses will be explained as an example. The device 105 and the device 106, which are image processing apparatuses, are examples of MFPs (Multifunction Peripherals) that include printing and scanning functions. Each of the device 105 and the device 106 receives print data that has been received via a network by using the printing function, and performs printing on an actual sheet or the like by using a known printing technique such as an electrophotographic technique or an inkjet technique. Each of the device 105 and the device 106 converts paper documents to image data by using the scanning function via a scanner. It should be noted that a network device may be any device capable of communication, for example, a single-function printer with only a printing function, a scanner, a 3D printer, a notebook computer, a smartphone, a smart home appliance, and the like.

Figure 2:
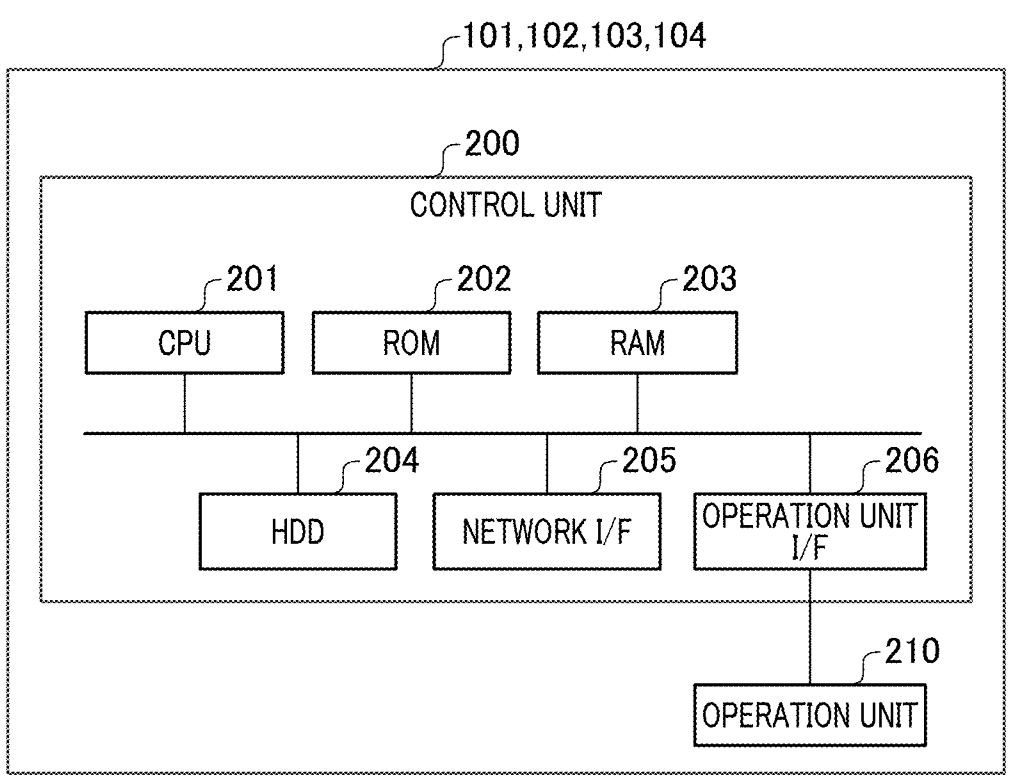
FIG. 2 is a diagram showing the hardware configuration of an information processing apparatus 104.

FIG. 2 is a diagram showing the hardware configuration of the information processing apparatus 104. It should be noted that the management server 101, the firmware distribution server 102, and the information processing apparatus 103 have similar hardware configurations to that of the information processing apparatus 104. The information processing apparatus 104 includes a control unit 200 and an operation unit 210. The control unit 200 is provided with a CPU 201, a ROM 202, a RAM 203, an HDD 204, a network I/F 205, and an operation unit I/F 206.

The CPU (Central Processing Unit) 201 controls the entire information processing apparatus 104. The CPU 201 performs various control processing by reading out control programs stored in the ROM 202 or the HDD 204. The control performed by the CPU 201 includes the execution of programs for implementing the flowcharts described below. The ROM (Read Only Memory) 202 is a data read-only memory and stores, for example, the basic control programs and the like of the information processing apparatus 104. The RAM (Random Access Memory) 203 is a data readable/writable memory, and is used as a temporary storage area such as a work area of the CPU 201. The HDD (Hard Disk Drive) 204 stores various types of data, programs, and applications. It should be noted that in the present embodiment, the example in which the information processing apparatus 104 is provided with the HDD 204 as a storage device is explained, but is not limited thereto, and other storage apparatuses such as an SSD, a Disk Drive for loading external media, and the like, may be provided.

The network I/F 205 connects the information processing apparatus 104 to the network. The information processing apparatus 104 transmits and receives various information with external devices via the network I/F 205 and the network. The operation unit I/F connects the control unit 200 and the operation unit 210. The operation unit 210 includes a display device and an input device. The display apparatus is, for example, an LCD (Liquid Crystal Display). The input apparatus is, for example, a keyboard, a pointing device, or the like. It should be noted that the display apparatus and the input apparatus may be implemented as an integrated touch panel. The GUI can be configured to give the impression that the user can directly operate the screen displayed on the touch panel by associating the input coordinates with the display coordinates on the touch panel.

Figure 3:
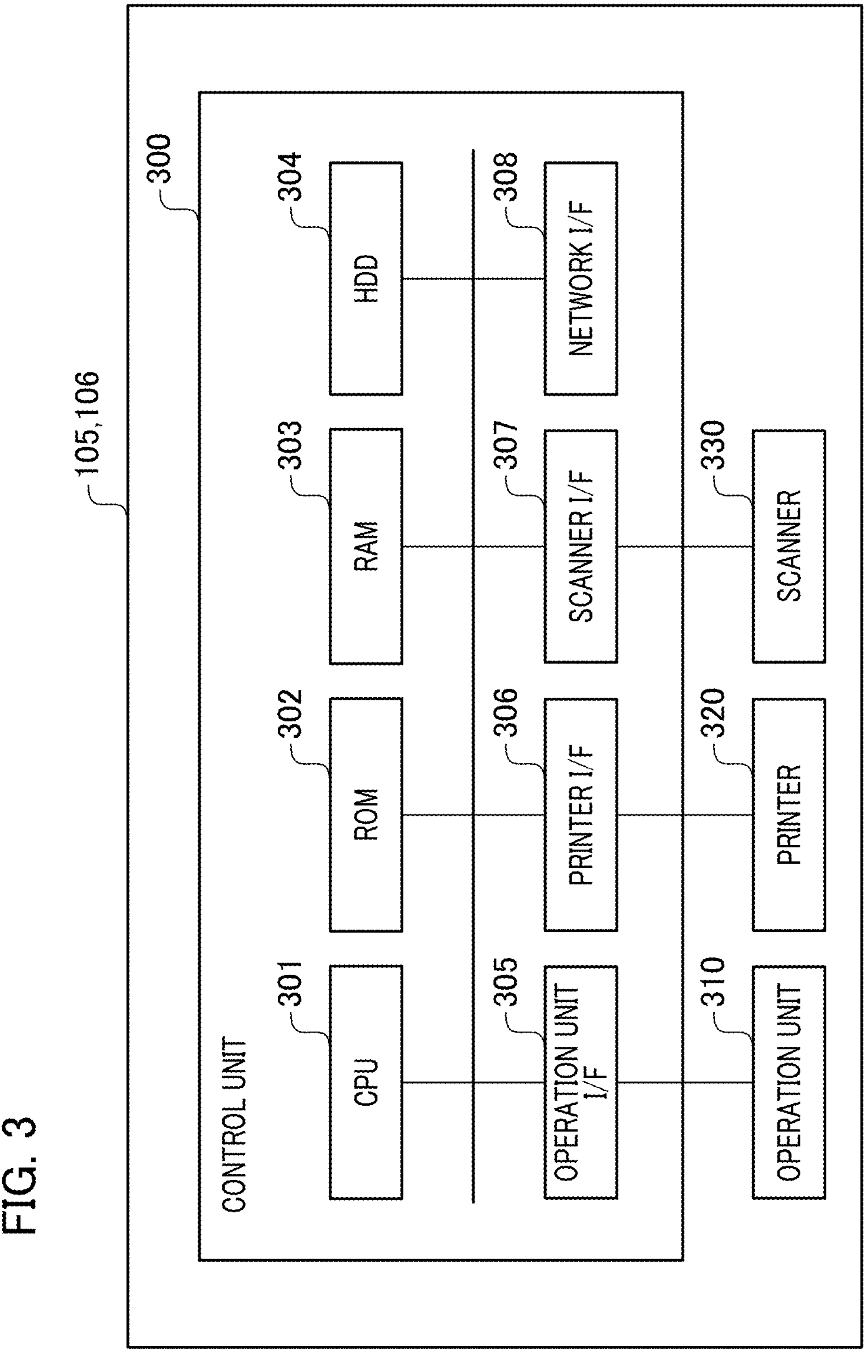
FIG. 3 is a diagram showing the hardware configuration of a device 105.

FIG. 3 is a diagram showing the hardware configuration of the device 105. It should be noted that the device 106 has a similar hardware configuration to that of the device 105. The device 105, which is an image processing apparatus, includes a control unit 300, an operation unit 310, a printer 320, and a scanner 330. The control unit 300 includes a CPU

301, a ROM 302, a RAM 303, an HDD 304, an operation unit I/F 305, a printer I/F 306, a scanner I/F 307, and a network I/F 308.

The CPU 301 executes various control processing of the device 105 by reading control programs stored in the ROM 302 or the HDD 304. The ROM 302 stores programs executed by the CPU 301. The RAM 303 is used as a temporary memory area that serves as the main memory, a work area, and the like of the CPU 301. The HDD 304 is a storage apparatus that stores image data, various programs, and various setting information. It should be noted that the device 105 may be provided with another storage apparatus such as an SSD (Solid State Drive) as the storage apparatus.

The operation unit I/F 305 connects the operation unit 310 and the control unit 300. The operation unit 310 is provided with, for example, a display unit having a touch panel function and various hard keys. The GUI can be configured as if the user can directly operate the screen displayed on the touch panel by associating input coordinates and display coordinates on the touch panel. The operation unit 310 functions as a display unit that displays information to the user and a receiving unit that receives an instruction from the user.

The printer I/F 306 connects the printer 320 and the control unit 300. The printer 320 prints, on the recording medium (for example, on paper), the original that the reader has read and the image data that has been stored in the HDD 304. In addition, the printer 320 prints image data based on the print job. The image data printed by the printer 320 is transferred from the control unit 300 via the printer I/F. The scanner I/F 307 connects the scanner 330 and the control unit 300. The scanner 330 reads a document placed on a document platen and generates image data. The generated image data is input to the control unit 300 via the scanner I/F 307. It should be noted that in the present embodiment, although an example in which the device 105 has both printing and scanning functions has been explained, the device 105 need only have at least one of a printing function and a scanning function.

The network I/F 308 is a communication interface that connects the device 105 to the network. For example, a network cable is connected to the network I/F 308 of the device 105, and execution of communication with external apparatuses on the network is possible. It should be noted that in the present embodiment, although it is assumed that the network I/F 308 is a communication interface for wired communication, the network I/F 308 is not limited thereto. For example, the network I/F 308 may be a wireless communication interface.

Figure 4:
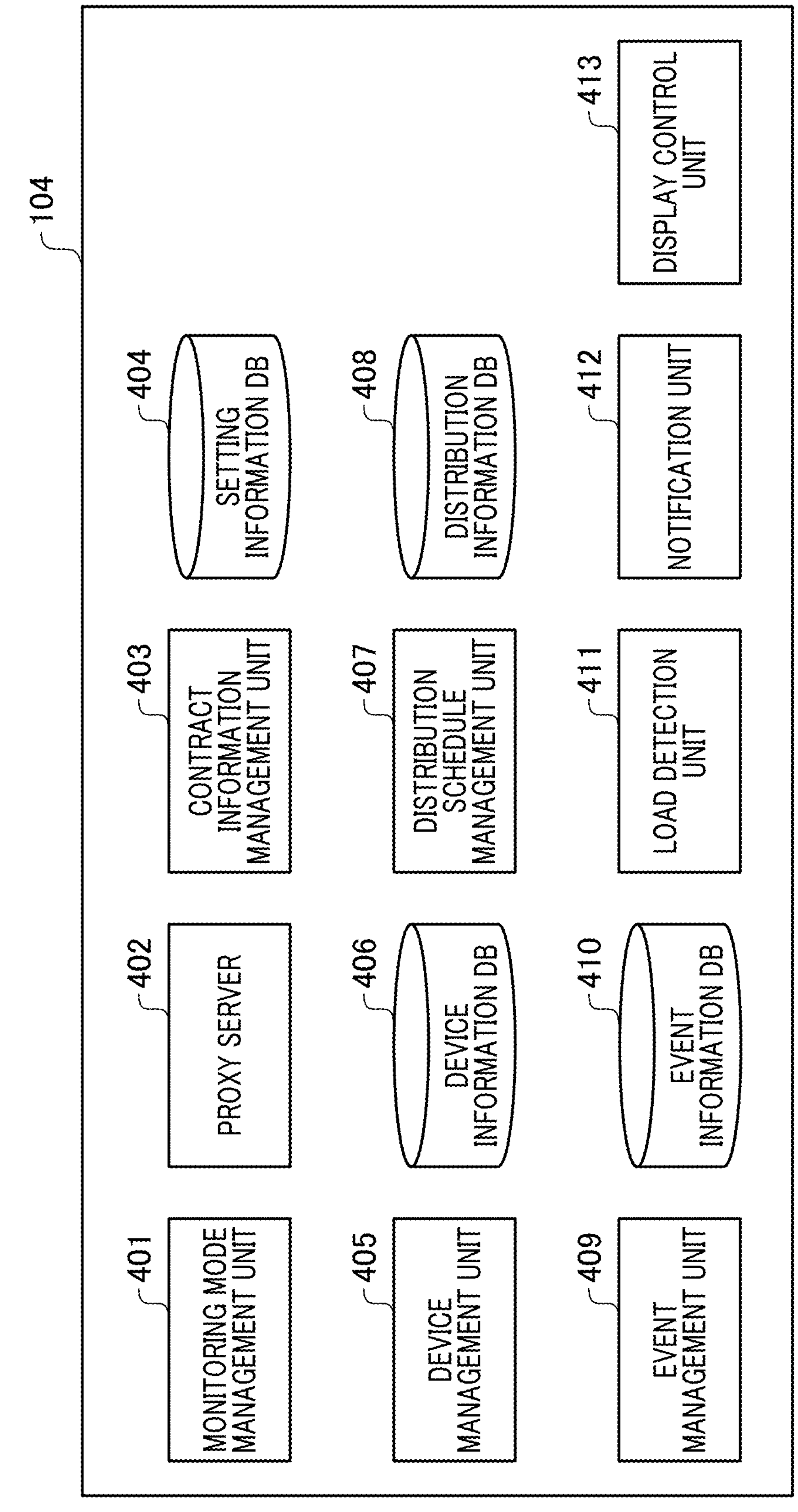
FIG. 4 is a diagram explaining the software configuration of the information processing apparatus 104.

FIG. 4 is a diagram explaining the software configuration of the information processing apparatus 104. The information processing apparatus 104 includes a monitoring mode management unit 401, a proxy server 402, a contract information management unit 403, a device management unit 405, a distribution schedule management unit 407, an event management unit 409, a load detection unit 411, a notification unit 412, and a display control unit 413. In addition, the information processing apparatus 104 has a setting information DB 404, a device information DB 406, a distribution information DB 408, and an event information DB 410 as databases. The software modules of the information processing apparatus 104 are implemented by the CPU 201 of the information processing apparatus 104 executing programs stored in the memory (the ROM 202 or the HDD 204).

The monitoring mode management unit 401 manages the monitoring mode that is set in the information processing apparatus 104. There are a proxy mode and a polling mode in the monitoring mode. In the polling mode, the information processing apparatus 104, functioning as a monitoring apparatus, acquires data from network devices such as the device 105 on the network 109 by periodic polling, transmits the acquired information to the device management system 100, and manages the devices. In the proxy mode, the information processing apparatus 104 functions as a proxy server that relays communication between network devices such as the device 105 on the network 109 and the device management system 100. It should be noted that when the relay application has been installed on the information processing apparatus 104, the monitoring mode is set by the user and this setting is stored in the setting value management table of the setting information DB 404. The proxy server 402 aggregates communication from network devices such as the device 105 on the network 109 and relays the communication between these network devices and the device management system 100.

The contract information management unit 403 manages the contract information related to the services provided by the device management system 100 that the user of the relay application has contracted. The contract information management unit 403 requests contract information from the management server 101, and saves and manages the contract information received as a response from the management server 101 in the setting information DB 404. The request of the contract information transmitted by the contract information management unit 403 includes, as user information, for example, an agent ID registered in the device management system 100 and a tenant ID associated with the location in which the information processing apparatus 104 is installed. The management server 101 identifies the contract information based on the user information (for example, the agent ID and the tenant ID) included in the request of the contract information and transmits the identified contract information to the information processing apparatus 104 that made the request. The contract information includes, for example, the contract date, the service start date, the service end date, and the contract details. The contract details include information with respect to the contracted services. For example, in a case in which a firmware distribution service is contracted, the contract details include the firmware distribution service.

The setting information DB 404 is a database configured to save the setting values of the relay application. The setting information DB 404 saves the setting values of the relay application in a setting value management table, for example. Table 1 is an example of a setting value management table.

TABLE 1

| Key | Value |
|---|---|
| Contract | Contract Date 2023 Oct. 1<br>Service Start Date 2023 Oct. 1<br>Service End Date 2024 Sep. 30<br>Contract Content Firmware distribution service, Service A, Service B |
| Mode | Proxy |

The setting value management table includes setting items (Key) such as Contract and Mode. "Contract" indicates the contract information of the services used by the relay application, and the setting value (Value) thereof stores the contract information acquired from the management server 101. In the example shown in Table 1, the contract date, the service start date, the service end date, and the contract details are stored in the contract information, and it can be understood that a plurality of services, including the firmware distribution service, are contracted. "Contract" indicates the monitoring mode that is set in the relay application, and the setting value (Value) thereof stores either "Proxy," indicating that the monitoring mode is in proxy mode, or "Polling," indicating that the monitoring mode is in polling mode. In the example shown in Table 1, it can be understood that the monitoring mode is in proxy mode.

The device management unit 405 manages the device information of network devices on the network 109. That is, the device management unit 405 manages the device information of the network devices that communicate with the device management system 100 via the information processing apparatus 104. The device information managed by the device management unit 405 includes, for example, information for identifying the devices, the monitoring method of the devices (monitoring mode), and information indicating whether or not the devices are already registered with the device management service provided by the device management system 100. Device information, for example, is also registered in the information processing apparatus 104 and saved in the device information DB 406 when the devices are registered as provision targets of services in the management server 101.

The device information DB 406 is a database configured to save the device information. The device information DB 406 manages the device information in a device management table, for example. Table 2 is an example of a device management table.

TABLE 2

| Device ID | Serial No. | Type | Registration State |
|---|---|---|---|
| Device01 | Serial0001 | Proxy | Registered |
| Device02 | Serial0020 | Proxy | Registered |
| Device03 | Serial0300 | Polling | Registered |

The device management table includes, as device information, for example, device ID, serial number, type, and registration state. The device ID and the serial number are information for identifying the devices. The device ID is an ID that is assigned when the devices are registered with the management server 101, for example. The serial number is an ID that is assigned to each apparatus when the device is shipped, for example. The type indicates the monitoring method of the devices (monitoring mode) and stores either "Proxy," indicating that the monitoring mode is in proxy mode, or "Polling," indicating that the monitoring mode is in polling mode. The type is set based on the management mode set in the information processing apparatus 104 and the capability information of the devices when the device information is registered in the information processing apparatus 104. The registration state indicates whether or not the devices are registered as management target devices by the device management service provided by the device management system 100. The registration state stores a value indicating either registered or unregistered. It should be noted that the device management table may further include information such as the model name of the devices, the IP addresses assigned to the devices, and the management status indicating whether or not the devices are currently covered by the device management service.

The distribution schedule management unit 407 manages the distribution schedule for firmware distribution for network devices. The distribution schedule management unit 407 acquires the distribution schedule for firmware distribution for network devices that has been set by the firmware distribution server 102 and saves the distribution schedule in the distribution information DB 408. In addition, the distribution schedule management unit 407 also functions as an adjustment unit configured to adjust the distribution schedule that has been set by the firmware distribution server 102 in consideration of the load on the proxy server 402. The distribution information DB 408 saves the schedule for firmware distribution for network devices.

The event management unit 409 manages the schedule of event transmission of network devices. Event transmission is, for example, communication performed as information collection by the device management system 100, and statuses of network devices and conditions of consumables such as the number of printed sheets are periodically transmitted from the network devices to the management server 101. The event information DB 410 saves the schedule of event transmission. It should be noted that the target that is managed by the event management unit 409 is not limited to event transmission, and the event management unit 409 may also manage the schedule of communication by services other than the firmware distribution service.

The load detection unit 411 detects a time period during which a predetermined load or higher is applied to the proxy server 402 by communication performed via the proxy server 402. Because the functions of the proxy server 402 are implemented by software in the information processing apparatus 104, which is a PC, there is a limit to the number of communication requests processable simultaneously by the proxy server 402. The load detection unit 411 detects, as the load detection for the communication of the proxy server 402, whether or not the communication between a device and a server scheduled via the proxy server 402 exceeds the number of communication requests processable simultaneously by the proxy server 402. In the present embodiment, the load detection unit 411 performs load detection for the firmware distribution schedule. In addition, in the present embodiment, the number of devices for which firmware distribution is performed via the proxy server 402 is the number of communication requests processed by the proxy server 402.

The notification unit 412 controls notifications from the information processing apparatus 104 to external apparatuses such as the management server 101 and the firmware distribution server 102. Notifications include, for example, a warning notification that the load of communication via the proxy server 402 (described later) exceeds a threshold value, and a notification of a change in the setting of the schedule for firmware distribution. The display control unit 413 controls the display to the display apparatus of the operation unit 210.

Although the schedule for firmware distribution for network devices is set by the firmware distribution server 102, the firmware distribution server 102 does not retain information on which devices are managed via the proxy server 402. Therefore, in the schedule of firmware distribution set by the firmware distribution server 102, there is a risk that the number of communication requests may exceed the number of communication requests processable simultaneously by the proxy server 402. Accordingly, in the information processing apparatus 104 having the proxy server 402, it is confirmed whether the communication for firmware distribution executed according to the schedule set by the firmware distribution server 102 exceeds the number of communication requests processable by the proxy server

402. Then, in a case in which the scheduled firmware distribution exceeds the number of communication requests processable by the proxy server 402, the information processing apparatus 104 performs a warning notification to the firmware distribution server 102. The firmware distribution server 102 that has received the warning notification displays a warning screen and performs a request to the user who sets the schedule to change the schedule or the like, thereby enabling the setting of a schedule that considers the load on the proxy server 402.

Accordingly, in the present embodiment, the information processing apparatus 104 executes distribution schedule confirmation processing to detect the load on the proxy server 402 due to firmware distribution based on the schedule for firmware distribution via the proxy server 402. Here, the flow of the distribution schedule confirmation processing will be explained by using FIG. 5. FIG. 5 is a sequence diagram showing the distribution schedule confirmation processing. In FIG. 5, each processing executed by the management server 101 of the device management system 100 is implemented by the CPU 201 of the management server 101 executing programs stored in memory (ROM 202 or HDD 204). Each processing executed by the firmware distribution server 102 of the device management system 100 is implemented by the CPU 201 of the firmware distribution server 102 executing programs stored in memory (ROM 202 or HDD 204). Each processing executed by the information processing apparatus 104 is implemented by the CPU 201 of the information processing apparatus 104 executing a program stored in memory (ROM 202 or HDD 204).

At step S501, the information processing apparatus 104 requests client contract information from the management server 101 of the device management system 100. This request includes information that specifies the client. The contract information includes information about the services contracted by the client, and it is possible to determine whether or not the firmware distribution service is contracted based on the contract information. At step S502, the management server 101 of the device management system 100, which has received the request for contract information, transmits the client contract information to the information processing apparatus 104.

At step S503, the information processing apparatus 104 stores the contract information acquired at step S502 to the contract information DB. At step S504, the information processing apparatus 104 confirms the monitoring mode of the local apparatus. The monitoring mode set in the information processing apparatus 104 is either polling mode or proxy mode. In a case in which the monitoring mode is set to polling mode, the present processing ends. In contrast, in a case in which the monitoring mode is set to proxy mode, the processing of step S505 is performed. Therefore, the processing subsequent to step S505 is performed in a case in which the monitoring mode of the information processing apparatus 104 is in proxy mode and the software distribution service is included in the contract information.

The processing subsequent to step S505 is executed periodically. At step S505, the information processing apparatus 104 specifies devices that are targets of firmware distribution. At step S506, the information processing apparatus 104 requests the distribution schedule of the devices specified at step S504 from the firmware distribution server 102 of the device management system 100. At step S507, the firmware distribution server 102 of the device management system 100, which has received the request of the distribution schedule, transmits the distribution schedule to the information processing apparatus 104.

At step S508, the information processing apparatus 104 detects a time period during which a predetermined load or higher is applied to the proxy server 402 based on the distribution information acquired at step S507. Here, the time period during which a predetermined load or higher is applied refers to the time of each day of the week at which the distribution schedule is planned for devices that exceed the number of devices that the proxy server 402 is capable of processing simultaneously. In a case in which there is a time period during which a load is applied to the proxy server 402, that is, in a case in which firmware distribution exceeding the processing capacity of the proxy server 402 has been set, the processing of step S509 is performed.

At step S509, the information processing apparatus 104 transmits a warning notification to the firmware distribution server 102 of the device management system 100 based on the detection result of step S508. The warning notification includes data that can specify the time period detected at step S508. At step S510, the firmware distribution server 102 of the device management system 100, which has received the warning notification from the information processing apparatus 104, displays a warning screen based on the warning notification. The firmware distribution server 102 provides the warning screen to the user via, for example, a web browser. The user (administrator) performs instructions on the screen (UI) provided by the firmware distribution server 102 for adjusting the distribution schedule during the notified time period. In adjusting the distribution schedule, for example, for some devices among the devices for which the distribution schedule is planned during the time period in which the load is applied, the distribution schedule is changed to another schedule during which no load is applied. Here, a schedule during which no load is applied refers to a schedule in which the number of devices does not exceed the number processable simultaneously by the proxy server 402. The firmware distribution server 102 receives instructions from the administrator for adjustment of the distribution schedule in the notified time period and is capable of setting the schedule for the firmware distribution based on these instructions.

Figure 6:
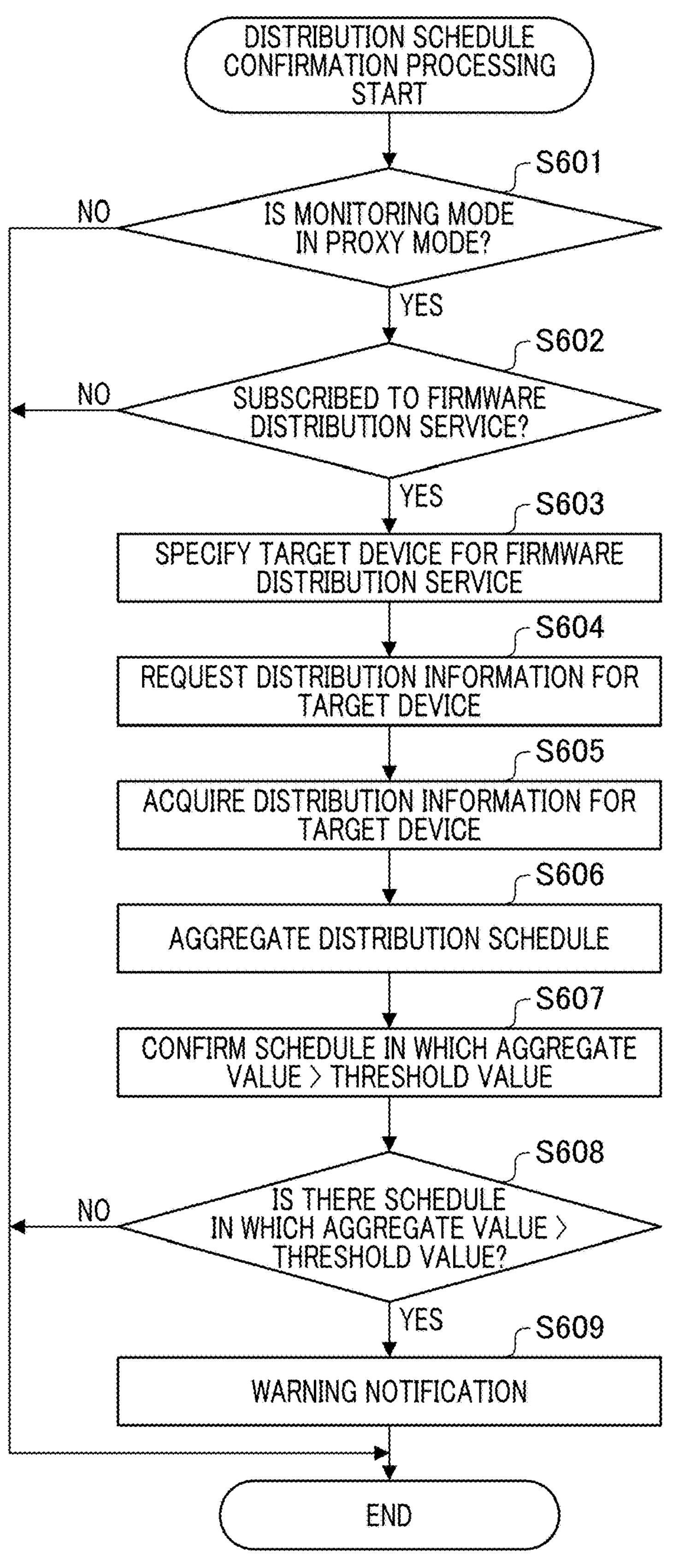
FIG. 6 is a flowchart showing distribution schedule confirmation processing in a first embodiment.

Details of the processing executed by the information processing apparatus 104 in the distribution schedule confirmation processing will be explained by using FIG. 6. FIG. 6 is a flowchart showing the distribution schedule confirmation processing in the First Embodiment. Each processing executed by the information processing apparatus 104 in FIG. 6 is implemented by the CPU 201 of the information processing apparatus 104 executing a program stored in the memory (ROM 202 or HDD 204). This processing is executed periodically, for example, every week. In addition to periodic processing, the processing may also be executed upon receiving an instruction from the user.

At step S601, the monitoring mode management unit 401 determines whether or not the monitoring mode of the information processing apparatus 104 is proxy mode. Specifically, the monitoring mode management unit 401 determines whether or not the monitoring mode of the information processing apparatus 104 is proxy mode based on the setting value of the mode (Mode) in the setting value management table (Table 1) stored in the setting information DB 404. In a case in which the monitoring mode is proxy mode, the information processing apparatus 104 performs the processing of step S602. In contrast, in a case in which the monitoring mode is polling mode, that is, in a case in which the monitoring mode is not proxy mode, the present processing ends.

At step S602, the contract information management unit 403 determines whether or not the client has contracted the firmware distribution service, that is, whether the client is a target of the firmware distribution service. Specifically, the contract information management unit 403 determines whether or not the client has contracted the firmware distribution service based on the setting value of the contract (Contract) in the setting value management table (Table 1) stored in the setting information DB 404. In a case in which the firmware distribution service is in the contract (Contract) setting value, that is, in a case in which the client has contracted the firmware distribution service, the information processing apparatus 104 performs the processing of step S603. In contrast, in a case in which the firmware distribution service is not in the contract (Contract) setting value, that is, in a case in which the client has not contracted the firmware distribution service, the present processing ends.

At step S603, the device management unit 405 specifies the network devices that are targets of the firmware distribution service executed via the proxy server 402 of the information processing apparatus 104. Specifically, the device management unit 405 specifies the devices for which the type registered in the device management table is "Proxy" and the registration status is "Registered" as devices that are the target of the firmware distribution service executed via the proxy server 402. In the example shown in Table 2, the devices for which the device ID is "Device0l" and "Device02" are specified as the devices that are targets of the firmware distribution service executed via the proxy server 402.

At step S604, the distribution schedule management unit 407 requests the firmware distribution schedule (firmware distribution information) of the network devices specified at step S603 from the firmware distribution server 102. The request includes information that uniquely identifies the network devices specified at step S603, such as a serial number. The firmware distribution server 102, which has received the request for the firmware distribution schedule from the information processing apparatus 104, identifies and returns the corresponding firmware distribution schedule based on the information that uniquely identifies the network devices included in the request. At step S605, the distribution schedule management unit 407 acquires the firmware distribution schedule (firmware distribution information) of the network devices specified at step S603 from the firmware distribution server 102. The firmware distribution schedule (firmware distribution information) includes information such as information that specifies the devices (for example, the serial number) and the days of the week and times at which the firmware distribution is scheduled. Table 3 is an example of firmware distribution information.

TABLE 3

| Serial No. | Day | Time |
| --- | --- | --- |
| Serial0001 | Mon | 2 |
| Serial0020 | Mon | 2 |
| Serial0300 | Tue | 3 |
| — | — | — |

In the example shown in Table 3, for example, the device having the serial number "Serial0001" has a schedule for firmware distribution set for Monday at 2:00.

At steps S606 to S608, the load detection unit 411 detects the time periods (schedule) during which a predetermined load or higher is applied to the proxy server 402 due to scheduled firmware distribution. At step S606, the load detection unit 411 aggregates the schedule for the firmware distribution that is executed via the proxy server 402. Specifically, the load detection unit 411 aggregates the number of devices for which firmware distribution is scheduled based on the firmware distribution schedule (firmware distribution information) acquired at step S605 for each schedule. Here, in the present embodiment, "for each schedule" refers to each time of each day of the week. In addition, for firmware distribution target devices for which a distribution schedule is not set, the schedule is aggregated as "Not set". Table 4 is an example of the aggregate results for each schedule.

TABLE 4

| Day | Time | No. of Devices |
| --- | --- | --- |
| Mon | 2 | 400 |
| Tue | 3 | 150 |
| Not set | Not set | 100 |
| — | — | — |

At step S607, the load detection unit 411 compares the number of devices aggregated at step S606 for each schedule with the number of devices set as the threshold value, and confirms whether the number of devices aggregated at step S606 exceeds the threshold value. The number of devices set as the threshold value is the number of devices set based on the number of devices that can communicate simultaneously in the proxy server 402, and may be a number that is set by the device management system 100 as a predetermined value or a number that is specified by the user. In the present embodiment, the number of devices set as the threshold value is 200. In the example shown in Table 4, the number of devices for which the distribution schedule is set at 2:00 on Monday is 400, which exceeds the threshold value. In contrast, the number of devices for which the distribution schedule is set at 3:00 on Tuesday is 150, which does not exceed the threshold value.

At step S608, the load detection unit 411 detects the schedules (time periods) that exceed the load capacity of the proxy server 402. Specifically, the load detection unit 411 determines whether a schedule in which the number of devices for which firmware distribution has been set exceeds the threshold value has been confirmed at step S607. In a case in which a schedule in which the number of devices for which firmware distribution has been set exceeds the threshold value has been confirmed, that is, in a case in which there is a schedule for firmware distribution that exceeds the capacity of the proxy server 402, the processing of step S609 is performed. In contrast, in a case in which a schedule in which the number of devices for which firmware distribution has been set exceeds the threshold value is not confirmed, that is, in a case in which there are only firmware distribution schedules that are processable by the proxy server 402, the present processing ends. In the example shown in Table 4, 2:00 on Monday is detected as a time period during which a load is applied to the proxy server 402.

At step S609, the load detection unit 411 performs a warning notification to the firmware distribution server 102 via the notification unit 412 based on the result of the detection of step S608. A notified warning may include, for example, that there is a risk of failure in the firmware distribution in the current firmware distribution schedule, and data of the time period during which a predetermined load or higher is applied to the proxy server 402. A schedule at risk of failure in firmware distribution is a schedule in which the number of devices aggregated at step S606 exceeds the threshold value. In addition, the warning notification may also include the number of devices set as the threshold value.

The processing by the information processing apparatus 104 is completed upon the warning notification of step S609. The firmware distribution server 102, which has received the warning notification from the information processing apparatus 104, displays a warning screen corresponding to the warning notification. FIG. 7 is a diagram showing an example of a warning screen. A warning screen 700 includes, for example, a message indicating that there is a risk of failure in the firmware distribution in the current schedule, the number of devices that can communicate simultaneously in the proxy server 402 that is set as the threshold value, and the schedule at risk of failure in the firmware distribution. The warning screen is displayed, for example, on an information processing apparatus such as a PC or the like of a user who uses the firmware distribution service provided by the firmware distribution server 102 via a web browser. By checking the warning screen 700, it becomes possible for the user who sets the schedule for the firmware distribution to the network devices to reset the schedule for the firmware distribution considering the load on the proxy server 402. Accordingly, this can suppress the risk of failure in the firmware distribution due to the performance of the information processing apparatus 104 functioning as the proxy server 402. It should be noted that, in the present embodiment, although an example has been explained in which a warning notification is performed only when the number of devices that are the target of the firmware distribution aggregated for each schedule exceeds the threshold value, the present invention is not limited thereto. For example, a notification that indicates that there is no problem in the schedule for the firmware distribution may also be configured to be performed even in a case in which the number of devices that are the target of the firmware distribution does not exceed the threshold value in all schedules.

As explained above, according to the present embodiment, it is possible to detect the time period during which a load is applied to the proxy server 402 by the scheduled firmware distribution in the information processing apparatus having the proxy server 402. Then, in a case in which the number of devices communicating simultaneously exceeds the predetermined value, and there is a possibility that the load on the proxy server 402 will cause the firmware distribution to fail, a warning is notified to the firmware distribution server 102, and it becomes possible to prompt the user to reconsider the schedule. Accordingly, it is possible to perform schedule management to suppress the failure of firmware distribution via the proxy server.

Second Embodiment

In the First Embodiment, although only the load due to firmware distribution was the target of aggregation for detecting the load on the proxy server 402, communication other than firmware distribution is also performed via the proxy server 402. There may be cases in which services that execute communication other than firmware distribution comprise a plurality of services that do not depend on each other, and it is difficult for the firmware distribution server 102 to grasp this communication. Therefore, in the present embodiment, it becomes possible to confirm the schedule for firmware distribution via the proxy server 402, considering the load on the proxy server 402 from other services in addition to the firmware distribution service. In the following descriptions, only the differences from the First Embodiment will be explained, and explanations of configurations and processes similar to the configurations and processes of the First Embodiment will be omitted by using the same reference numerals.

Figure 8:
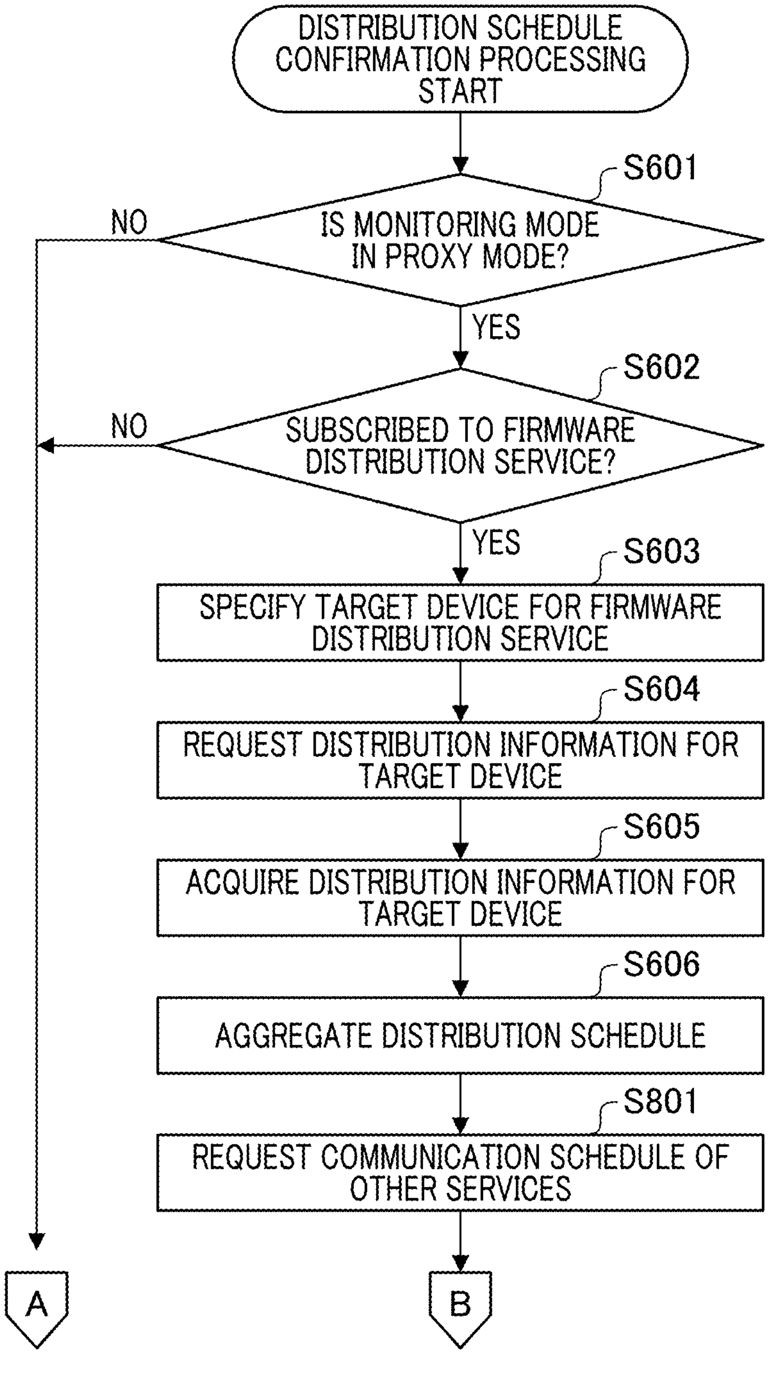
FIG. 8 is a flowchart showing distribution schedule confirmation processing in a second embodiment.
Figure 9:
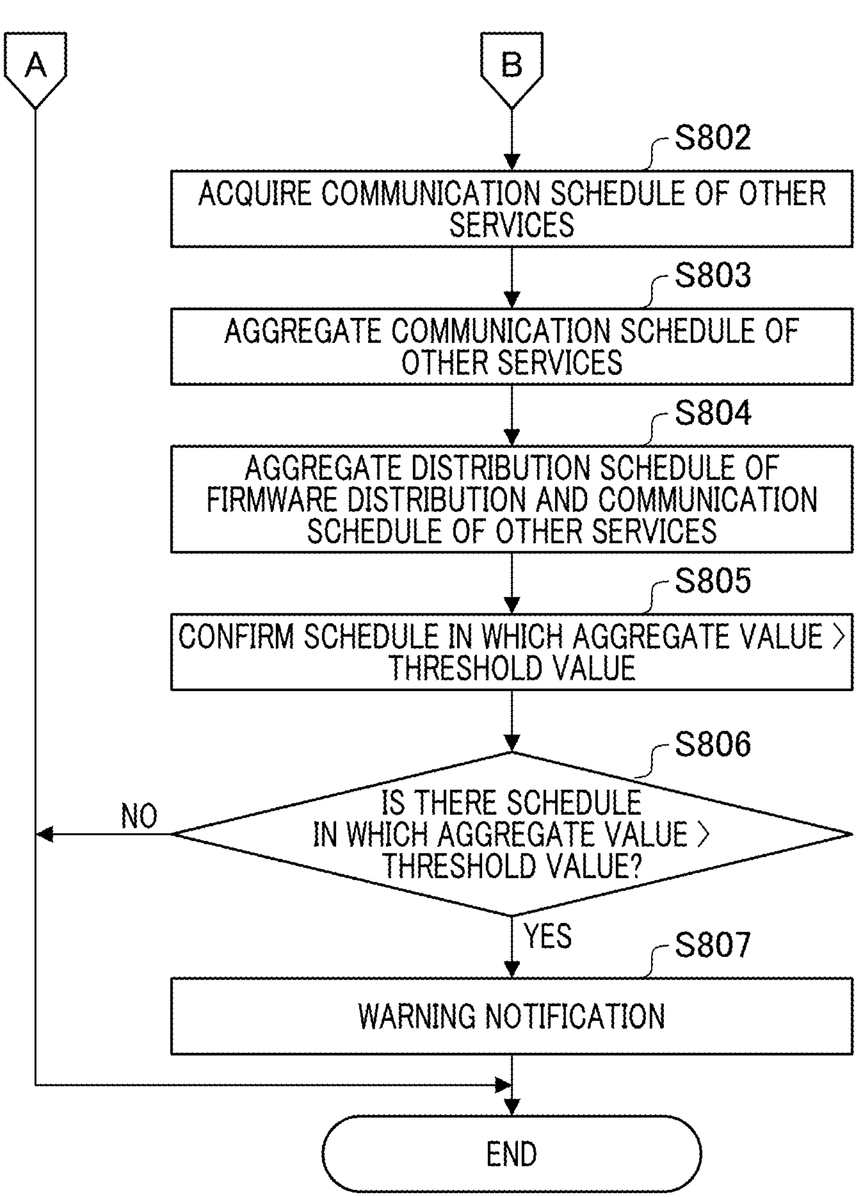
FIG. 9 is a flowchart showing distribution schedule confirmation processing in the second embodiment.

Details of the processing executed by the information processing apparatus 104 in the distribution schedule confirmation processing will be explained by using FIG. 8 and FIG. 9. FIG. 8 and FIG. 9 are flowcharts showing the distribution schedule confirmation processing in the Second Embodiment. Each processing executed by the information processing apparatus 104 in FIG. 8 and FIG. 9 is implemented by the CPU 201 of the information processing apparatus 104 executing a program stored in the memory (ROM 202 or HDD 204). This processing is executed periodically, for example, every week and the like. In addition to periodic processing, the processing may also be executed in a case in which there has been an instruction from the user.

The information processing apparatus 104 performs the processing of step S801 after aggregating the schedule for the firmware distribution that is executed via the proxy server 402 in step S606. At step S801, the event management unit 409 requests from the device management system 100 the schedule of communication by services other than the firmware distribution service for the devices specified at step S603. That is, the event management unit 409 requests the schedule of communications, other than the firmware distribution schedule, that are performed via the proxy server 402. In the present embodiment, although the event transmission schedule by a remote monitoring service for a device is explained as an example of a schedule by other services of the firmware distribution service, the present invention is not limited thereto. In addition, there may be a plurality of other services besides the firmware distribution service. The event management unit 409 requests, for example, an event transmission schedule from the management server 101 that provides a remote monitoring service of the devices. This request may include information that specifies the devices specified at step S603 (for example, a serial number). The device management system 100, which has received the request from the information processing apparatus 104 having the proxy server 402, transmits the schedule of communication by other services of the firmware distribution service to the information processing apparatus 104 based on the information that specifies the devices. For example, the management server 101 of the device management system 100 transmits the event transmission schedule of the target devices to the information processing apparatus 104.

At step S802, the event management unit 409 acquires from the device management system 100 the communication schedules, excluding the firmware distribution schedules, of the network devices specified at step S603. The information of the communication schedules other than the firmware distribution schedules includes details that specify the devices (for example, serial numbers) and the days of the week and times at which the communication is scheduled.

At step S803, the load detection unit 411 aggregates the schedules of communications, excluding firmware distribution, that are executed via the proxy server 402. Specifically, the load detection unit 411 aggregates the number of devices for which communication, other than firmware distribution, are scheduled based on the communication schedules acquired at step S802 for each schedule (for each time of each day of the week). In the present embodiment, the load detection unit 411 aggregates the number of devices for which event transmission by the remote monitoring service of the devices is scheduled for each schedule (for each time of each day of the week).

At step S804, the load detection unit 411 aggregates the number of devices scheduled to execute communication via the proxy server 402 for each schedule (for each time of each day of the week). Specifically, the load detection unit 411 combines the schedule for the firmware distribution aggregated at step S606 with the schedules of communication other than firmware distribution aggregated at step S803, and aggregates the number of devices for each schedule (for each time of each day of the week).

At step S805, the load detection unit 411 compares the number of devices aggregated at step S804 for each schedule with the number of devices set as the threshold value to confirm whether the number of devices aggregated at step S804 exceeds the threshold value. The number of devices set as the threshold value is a number of devices that have been set based on the number of devices that can communicate simultaneously in the proxy server 402. In the present embodiment, the number of devices set as the threshold value is 200.

At step S806, the load detection unit 411 detects the schedules that exceed the load of the proxy server 402. Specifically, the load detection unit 411 determines whether a schedule has been confirmed in which communications for a number of devices that exceeds the threshold value have been set at step S805. In a case in which a schedule in which communication for a number of devices exceeding the threshold value has been confirmed, that is, in a case in which there is a communication schedule that exceeds the capacity of the proxy server 402, the processing of step S807 is performed. In contrast, in a case in which a schedule in which communication for a number of devices exceeding the threshold value is not confirmed, that is, in a case in which there are only communication schedules that are processable by the proxy server 402, the present processing ends.

At step S807, the load detection unit 411 performs a warning notification to the firmware distribution server 102 via the notification unit 412. A notified warning may include, for example, that there is a risk of failure in the firmware distribution in the current schedule, and schedules at risk of failure in the firmware distribution. A schedule at risk of failure in the firmware distribution is a schedule in which the number of devices aggregated at step S804 exceeds the threshold value. In addition, the warning notification may also include the number of devices that are set as the threshold value.

It should be noted that, in the present embodiment, although only the comparison between the total number of devices for both firmware distribution and other communications and the threshold value was performed, in addition to this, a comparison may be performed between the number of devices in the firmware distribution and the threshold value. This can be implemented, for example, by performing the processing of steps S607 and S608 of the First Embodiment between steps S606 and S801. Furthermore, in a case in which there are communications by a plurality of services other than firmware distribution, the aggregation of the number of devices for each service for each schedule may be performed so that a comparison with the threshold value is also performed. Accordingly, the information processing apparatus 104 can perform a more detailed warning notification with respect to the communication that cause the load on the proxy server 402. Based on the warning notification, the warning screen can display more specifically the services scheduling the communications and the number of devices thereof for schedules exceeding the threshold value, and it is possible for the user to grasp the schedules exceeding the threshold value via the warning screen and utilize these for resetting the schedule.

As explained above, according to the present embodiment, considering a case in which other services schedule communication via the proxy server 402 in addition to the firmware distribution, it becomes possible to detect the time periods during which a load is applied to the proxy server 402. Accordingly, it is possible to perform schedule management for suppressing the failure of software distribution via the proxy server.

Third Embodiment

In the First and Second embodiments, in a case in which the load on the proxy server exceeds the specified value, a warning notification is performed to the firmware distribution server, and the firmware distribution server provides a warning screen corresponding to the notification to the user, prompting the user to adjust the schedule. In the present embodiment, to reduce the burden of rescheduling for the user, an appropriate schedule is automatically reset so that the load on the proxy server does not exceed the specified value. Therefore, in the present embodiment, in a case in which the load on the proxy server exceeds the specified value, the information processing apparatus having the proxy server resets the schedule to ensure the load on the proxy server does not exceed the specified value and notifies the firmware distribution server of the new schedule.

Figure 10:
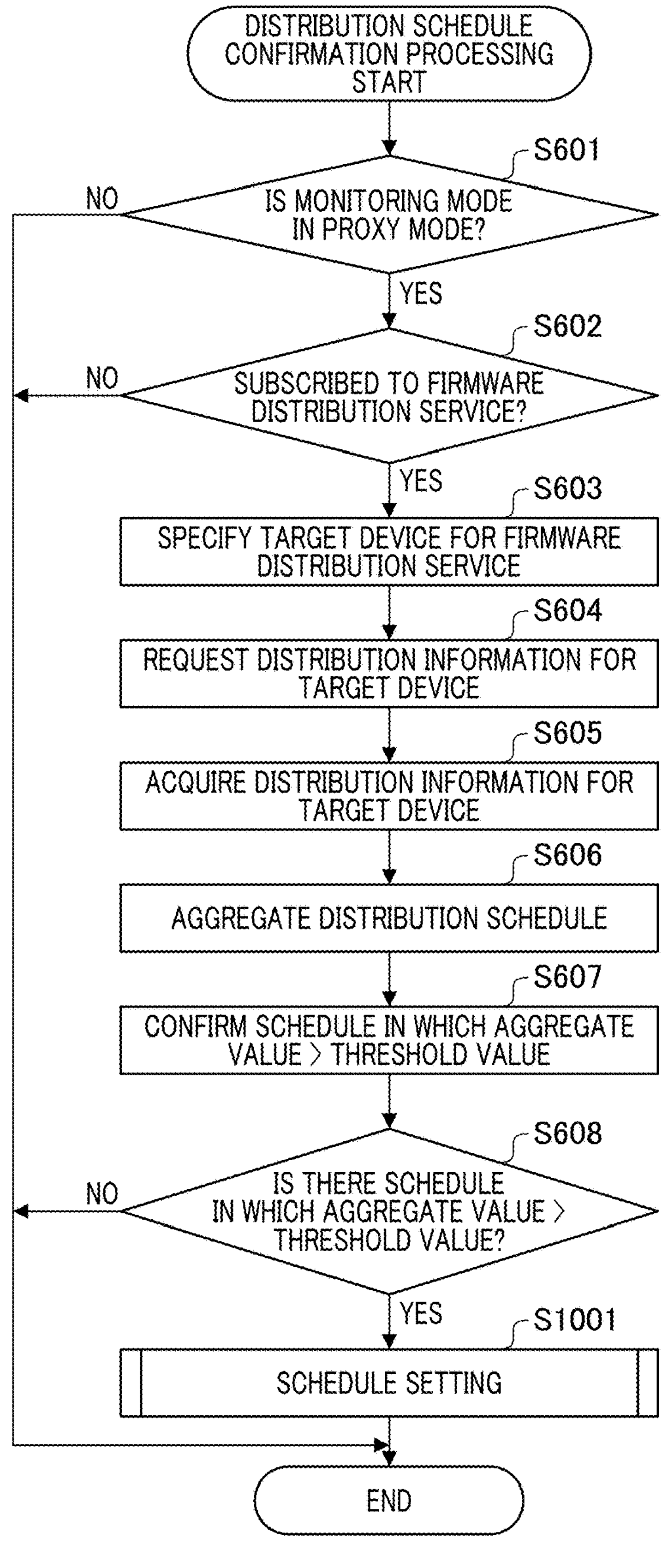
FIG. 10 is a flowchart showing distribution schedule confirmation processing in a third embodiment.

Details with respect to the processing that is executed by the information processing apparatus 104 in the distribution schedule confirmation processing of the present embodiment will be explained by using FIG. 10. FIG. 10 is a flowchart showing distribution schedule confirmation processing in a third embodiment. Each processing that is executed by the information processing apparatus 104 in FIG. 10 is implemented by the CPU 201 of the information processing apparatus 104 executing a program stored in the memory (ROM 202 or HDD 204). This processing is executed periodically, for example, every week and the like. In addition to periodic processing, the processing may also be executed in a case in which there has been an instruction from the user.

The processing of steps S601 to S608 is similar to the processing of the First Embodiment. At step S1001, the distribution schedule management unit 407 performs schedule setting processing. That is, instead of the warning notification processing (step S609) of the First Embodiment, schedule setting processing is performed in the present embodiment. Similarly, instead of the warning notification processing (step S807) of the Second Embodiment, schedule setting processing (step S1001) may be performed. In the schedule setting processing, the information processing apparatus 104 adjusts the distribution schedule considering the load on the proxy server 402, and notifies the adjusted schedule to the firmware distribution server 102.

Figure 11:
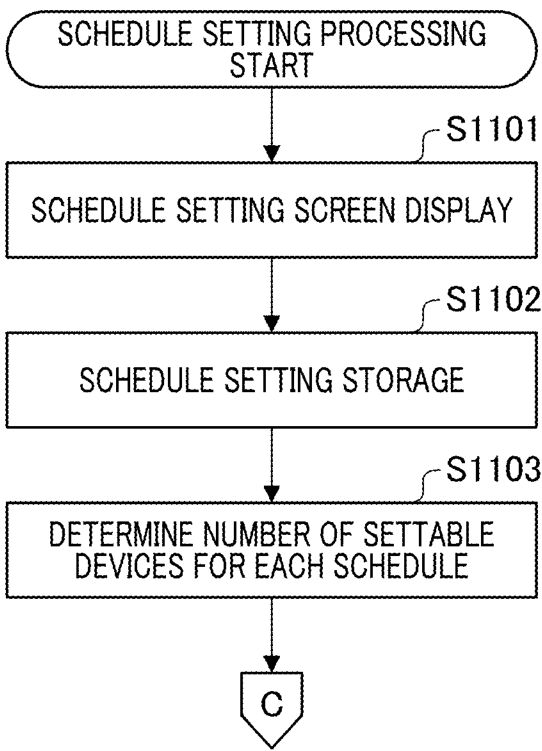
FIG. 11 is a flowchart showing schedule setting processing.
Figure 12:
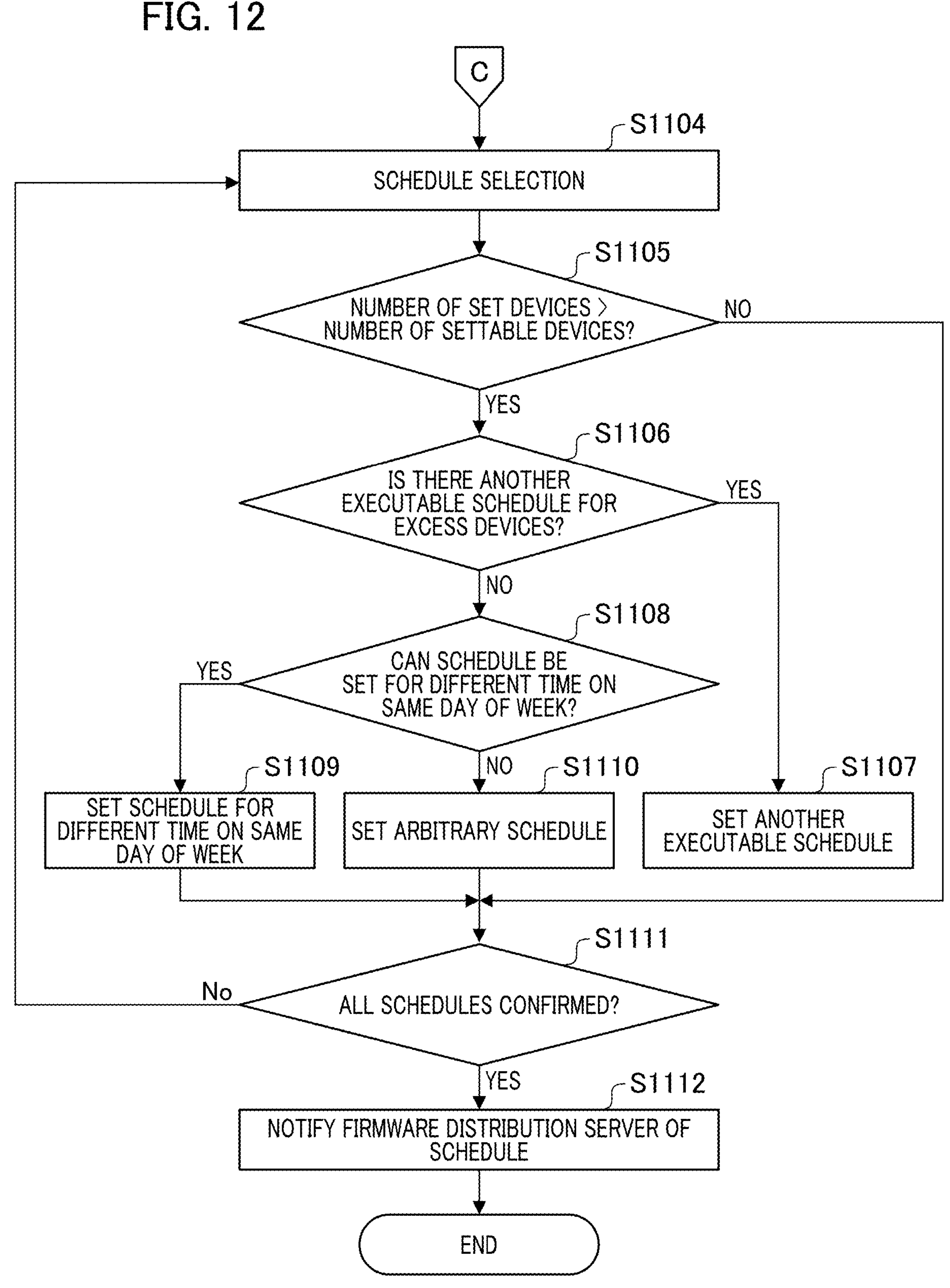
FIG. 12 is a flowchart showing schedule setting processing.

Details with respect to the schedule setting processing will be explained by using FIG. 11 and FIG. 12. FIG. 11 and FIG. 12 are flowcharts showing the schedule setting processing. Each processing executed by the information processing apparatus 104 in FIG. 11 and FIG. 12 is implemented by the CPU 201 of the information processing apparatus 104 executing a program stored in the memory (ROM 202 or HDD 204).

At step S1101, the distribution schedule management unit 407 displays the schedule setting screen. Specifically, the distribution schedule management unit 407 displays the schedule setting screen on the display device of the operation unit 210 of the information processing apparatus 104 via the display control unit 413. The schedule setting screen is a screen for the user to set the schedule in which firmware distribution is possible. An example of the schedule setting screen is shown in FIG. 13.

Figure 13:
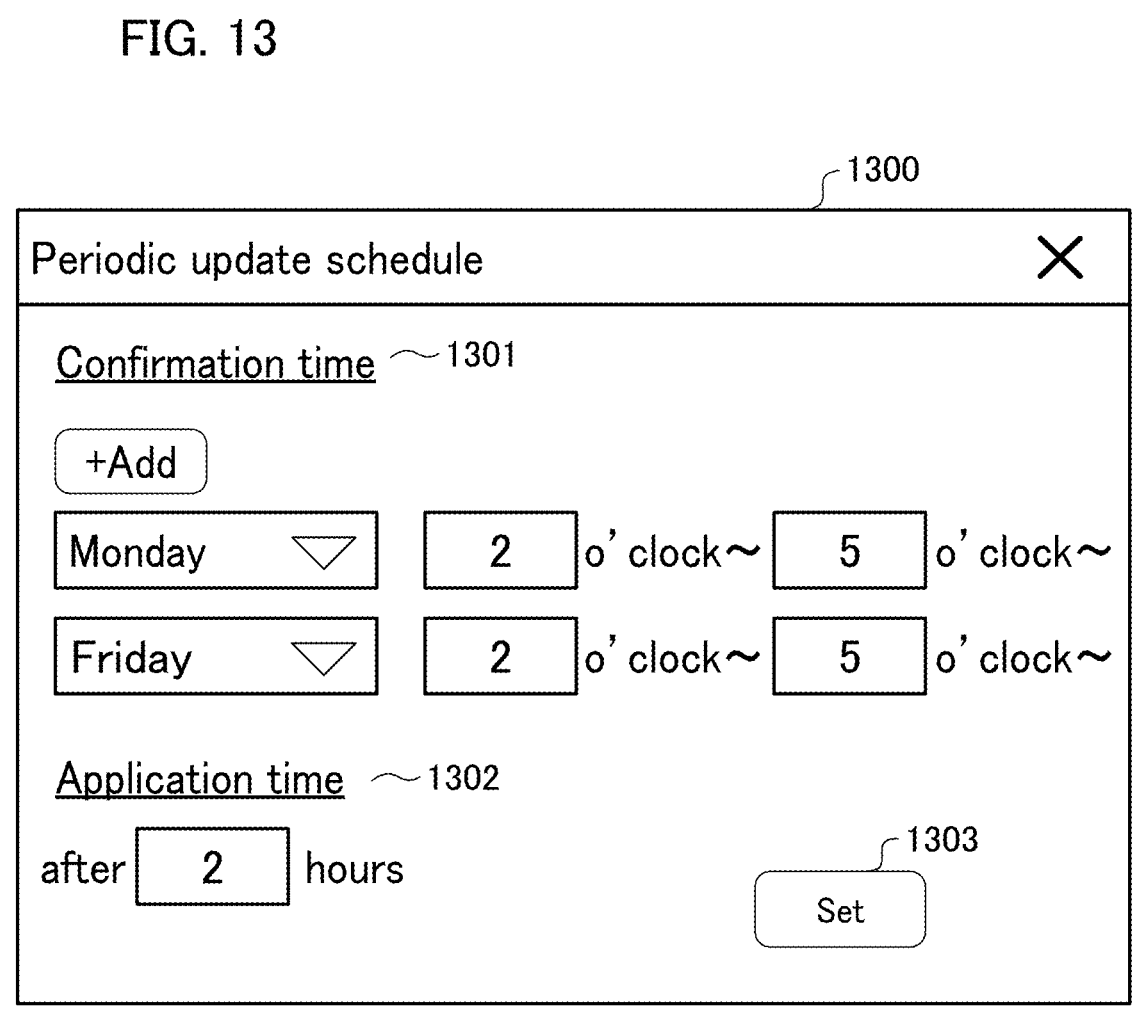

FIG. 13 is a diagram showing an example of the schedule setting screen. A schedule setting screen 1300 includes a confirmation time 1301 to set the time during which firmware distribution is possible, an application time 1302 to set the time to apply the confirmation time 1301, and a setting button 1303 for reflecting the set content. The user sets the schedule (days of the week and time periods) during which firmware distribution is possible in the confirmation time 1301. In the confirmation time 1301, it is possible to set a plurality of days of the week and time periods. In a case in which the number of devices that can communicate simultaneously in the proxy server 402 is exceeded, although the information processing apparatus 104 sets a new schedule for firmware distribution for the excess devices, the schedule set in the confirmation time 1301 is preferentially set. In the application time 1302, the user sets the time to apply the confirmation time 1301. For example, in the application time 1302, the user may set the time to apply the settings, such as two hours later, or specify a date and time. In addition, in a case of immediate application, zero hours may be specified. When the settings for the confirmation time 1301 and the application time 1302 are completed, the user presses the setting button 1303. Upon detecting the press of the setting button 1303, the information processing apparatus 104 performs the processing of step S1102.

At step S1102, the distribution schedule management unit 407 saves the setting content of the schedule setting screen 1300. For example, the distribution schedule management unit 407 saves the confirmation time 1301 and the application time 1302 specified in the schedule setting screen 1300 as the distribution schedule in the distribution information DB 408. It should be noted that the processing of steps S1101 and S1102 may be performed in advance.

At step S1103, the distribution schedule management unit 407 determines the number of settable devices for firmware distribution for each schedule. The number of settable devices is determined based on the performance of the proxy server 402 and the number of devices that perform communication via the proxy server 402. Because the number of devices that can communicate simultaneously in the proxy server 402 is determined by the capacity of the proxy server 402, the number of settable devices is determined so that the total number of devices that perform both firmware distribution and other communication does not exceed this number. Therefore, in a case in which the firmware distribution does not overlap with the communication schedule of other services such as event transmission, the number of devices that can communicate simultaneously in the proxy server 402 (specified value) becomes the number of settable devices for firmware distribution. In a case in which the firmware distribution overlaps with the communication schedule of other services such as event transmission, the number of devices that perform communication by other services is subtracted from the specified value, and the resulting number becomes the number of settable devices for firmware distribution.

At step S1104, the distribution schedule management unit 407 selects one schedule that becomes the target of the schedule change processing. The processing of steps S1105 to S1110 is executed for the schedule selected at step S1104, and by performing this processing for all schedules, it becomes possible to adjust the schedule for firmware distribution considering the capacity of the proxy server 402.

At step S1105, the distribution schedule management unit 407 determines whether the number of devices that perform communication via the proxy server 402 set in the schedule selected at step S1104 (number of set devices) exceeds the number of settable devices determined at step S1103. In a case in which the number of set devices exceeds the number of settable devices, the processing of step S1106 is performed. In contrast, in a case in which the number of set devices does not exceed the number of settable devices, the processing of step S1111 is performed.

At step S1106, the distribution schedule management unit 407 confirms whether another executable schedule for firmware distribution is set for the set devices that exceed the number of settable devices (excess devices). "Another executable schedule" is a schedule other than the schedule selected at step S1104 among the schedules set for the excess devices, and is a schedule in which the number of set devices does not exceed the number of settable devices. In a case in which another executable schedule for firmware distribution has been set, the processing of step S1107 is performed. In contrast, in a case in which another executable schedule for firmware distribution has not been set, the processing of step S1108 is performed. At step S1107, the distribution schedule management unit 407 performs a change of the settings of the schedule for the firmware distribution for the excess devices. Specifically, the distribution schedule management unit 407 sets another executable schedule for firmware distribution as the schedule for the firmware distribution for the excess devices and performs schedule adjustment by deleting the schedule selected at step S1104. The distribution schedule management unit 407 stores the adjusted schedule for the firmware distribution in the distribution information DB 408.

In a case in which another executable schedule for firmware distribution has not been set for the excess devices, a setting change of the schedule is performed based on the schedule that was set in the confirmation time 1301 in the schedule setting screen 1300. At step S1108, the distribution schedule management unit 407 confirms whether the schedule of the excess devices can be changed to another time on the same day. The schedule that can be set at step S1108 is a settable schedule within the schedule set in the confirmation time 1301 in the schedule setting screen 1300, and is a schedule at another time on the same day as the schedule currently set for the excess devices. The settable schedule is a schedule in which the number of set devices does not exceed the number of settable devices. The distribution schedule management unit 407 confirms whether the schedule for the excess devices can be changed to another time on the same day based on the distribution schedule saved in the distribution information DB 408. In a case in which the schedule of the excess devices can be changed to another time on the same day, the processing of step S1109 is performed. In contrast, in a case in which the schedule of the excess devices cannot be changed to another time on the same day, the processing of step S1110 is performed. At step S1109, the distribution schedule management unit 407 performs a change of the schedule setting for the firmware distribution for the excess devices. Specifically, the distribution schedule management unit 407 adjusts and sets the schedule for firmware distribution for the excess devices to another time on the same day within the schedule set in the confirmation time 1301. The distribution schedule management unit 407 stores the adjusted schedule for firmware distribution in the distribution information DB 408.

At step S1110, the distribution schedule management unit 407 performs a change of the setting of the schedule for the firmware distribution for the excess devices. The distribution schedule management unit 407 adjusts and sets the schedule for the firmware distribution for the excess devices as the distribution schedule for the excess devices within the schedule set in the confirmation time 1301 in which the number of set devices does not exceed the number of settable devices. The distribution schedule management unit 407 stores the adjusted schedule for firmware distribution in the distribution information DB 408.

At step S1111, the distribution schedule management unit 407 determines whether all the schedules have been confirmed. In a case in which all the schedules have been selected at step S1104, the distribution schedule management unit 407 considers all the schedules as having been confirmed, and performs the processing of step S1112. In contrast, in a case in which the selection of all the schedules has not been completed at step S1104, the distribution schedule management unit 407 considers that not all the schedules have been confirmed, and returns to the processing of step S1104. At step S1104, the distribution schedule management unit 407 selects a new unselected schedule.

At step S1112, the distribution schedule management unit 407 notifies the firmware distribution server 102 of the adjusted firmware distribution schedule via the notification unit 412. The distribution schedule management unit 407 notifies the firmware distribution server 102 of the schedule of the adjusted firmware distribution for the devices for which the settings were changed, that is, the excess devices. The firmware distribution server 102, which has received the notification of the setting changes from the information processing apparatus 104, updates the schedule for firmware distribution for the target devices based on the contents of the notification and stores the updated schedule. By the above processing, it becomes possible for the information processing apparatus 104 having the proxy server 402 to change the distribution schedule of the devices using the proxy server 402 to an appropriate distribution schedule and apply the change of the schedule to the firmware distribution server 102.

In the first to third embodiments, although the information processing apparatus 104 was a PC or the like, the information processing apparatus 104 may be a network device (for example, an image processing apparatus) that is a management target of the device management system 100. In this case, the image processing apparatus, which is a network device, incorporates a proxy server, and the image processing apparatuses on the network 109, which includes the image processing apparatus, perform communication with the device management system 100 via the proxy server.

In addition, in the first to third embodiments, although the load detection and schedule changes were performed by the information processing apparatus 104 having the proxy server 402, load detection and schedule changes may be performed on the firmware distribution server 102 side. The firmware distribution server 102 does not manage the network environment of the client and does not have information on which network devices are performing communication via the proxy server 402. Therefore, the firmware distribution server 102 needs to acquire information on the network devices (target devices) that perform firmware distribution via the proxy server 402 from the information processing apparatus 104. Accordingly, the information processing apparatus 104, which has received a request for device specification from the firmware distribution server 102, performs the processing of steps S601 to S603, and transmits the information of the target devices to the firmware distribution server 102 by specifying the information of the target devices. The firmware distribution server 102, which has acquired the information of the target devices, performs load detection of the proxy server 402 by executing processing similar to the processing of steps S605 to S608, and performs display of the warning screen 700 based on the result of the load detection. Accordingly, it is possible to acquire the necessary information from the information processing apparatus 104 having the proxy server 402 and perform load detection and changes of schedules on the firmware distribution server 102 side.

In this manner, according to the present embodiment, it becomes possible to adjust the schedule for firmware distribution considering the performance of the proxy server. Accordingly, it is possible to perform schedule management for suppressing the failure of software distribution via the proxy server.

Other Embodiments

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-131083, filed Aug. 10, 2023, which is hereby incorporated by reference wherein in its entirety.

What is claimed is:

1. An information processing apparatus comprising:

a proxy server configured to relay communication between a network device and a software distribution system that provide software distribution services to the network device;

a memory storing instructions; and a processor executing the instructions causing the information processing apparatus to:

acquire a distribution schedule of the network device, which is the target of the software distribution service and performs communication via the proxy server, from the software distribution system;

detect time periods during which a predetermined load or higher is applied to the proxy server based on the distribution schedule by communication performed with a plurality of the network devices via the proxy server; and perform a notification to the software distribution system based on the result of the detection, wherein a monitoring mode in which the information processing apparatus monitors the network device includes a proxy mode and a polling mode, and when the monitoring mode is the proxy mode, the information processing apparatus acquires the distribution schedule from the software distribution system.

2. The information processing apparatus according to claim 1, wherein the load applied to the proxy server is specified based on the number of devices that perform communication via the proxy server.

3. The information processing apparatus according to claim 1, wherein the monitoring mode of the information processing apparatus monitors the network device is the proxy mode, and the information processing apparatus acquires contract information that includes the contract content of client services from the device management system that manages the network device, and in a case in which the software distribution service is included in the contract content, the information processing apparatus periodically specifies the network device that acquires the distribution schedule from the software distribution system, and acquires the distribution schedule for the network device from the software distribution system, and detects a time period during which a predetermined load or higher is applied to the proxy server based on the distribution schedule.

4. The information processing apparatus according to claim 1, wherein the notification includes data that can specify the detected time period, and the software distribution system that has received the notification provides a warning screen to indicate to the user a time period during which a predetermined load or higher is applied to the proxy server.

5. The information processing apparatus according to claim 4, wherein the software distribution system is capable of accepting instructions from an administrator to adjust the distribution schedule during the notified time period.

6. The information processing apparatus according to claim 1, wherein the processor detects a time period during which a predetermined load or higher is applied to the proxy server based on the distribution schedule and the schedule of communication via the proxy server between other services of the software distribution service and the network device.

7. The information processing apparatus according to claim 1, wherein the processor further executes an instruction causing the information processing apparatus to perform an adjustment of the distribution schedule in the detected time period in a case in which a time period during which a predetermined load or higher is applied to the proxy server is detected; and wherein the notification is a notification of the adjusted new distribution schedule, and the software distribution system that has received the notification updates the distribution schedule for software based on the notification.

8. A control method for an information processing apparatus comprising a proxy server configured to relay communication between a network device and a software distribution system that provide software distribution services to the network device, the method comprising:

acquiring a distribution schedule of the network device, which is the target of the software distribution service and is configured to perform communication via the proxy server, from the software distribution system;

detecting time periods during which a predetermined load or higher is applied to the proxy server based on the distribution schedule by communication performed with a plurality of the network devices via the proxy server; and performing a notification to the software distribution system based on the result of the detection, wherein a monitoring mode in which the information processing apparatus monitors the network device includes a proxy mode and a polling mode, and when the monitoring mode is the proxy mode, the information processing apparatus acquires the distribution schedule from the software distribution system.

9. A non-transitory storage medium storing a control program of an information processing apparatus comprising a proxy server configured to relay communication between a network device and a software distribution system that provide software distribution services to the network device, the control program causing a computer to perform each step of a control method of the information processing apparatus, the method comprising:

acquiring a distribution schedule of the network device, which is the target of the software distribution service and is configured to perform communication via the proxy server, from the software distribution system;

detecting time periods during which a predetermined load or higher is applied to the proxy server based on the distribution schedule by communication performed with a plurality of the network devices via the proxy server; and performing a notification to the software distribution system based on the result of the detection, wherein a monitoring mode in which the information processing apparatus monitors the network device includes a proxy mode and a polling mode, and when the monitoring mode is the proxy mode, the information processing apparatus acquires the distribution schedule from the software distribution system.

* * * * *